United States Patent [19]

Hafner

[11] Patent Number: 5,255,427
[45] Date of Patent: Oct. 26, 1993

[54] CERAMIC HOLLOW BODIES AND METHOD OF MANUFACTURING SUCH BODIES

[75] Inventor: Hans W. Hafner, Aichach-Walchshofen, Fed. Rep. of Germany

[73] Assignee: Pfister GmbH, Augsburg, Fed. Rep. of Germany

[21] Appl. No.: 745,648

[22] Filed: Aug. 16, 1991

Related U.S. Application Data

[63] Continuation-in-part of Ser. No. 627,103, Dec. 13, 1990, abandoned.

[30] Foreign Application Priority Data

Mar. 7, 1989 [DE] Fed. Rep. of Germany ....... 3907202
Jun. 14, 1989 [DE] Fed. Rep. of Germany ....... 3919411
Aug. 17, 1990 [DE] Fed. Rep. of Germany ....... 4026044

[51] Int. Cl.$^5$ ............................................. G01R 3/00
[52] U.S. Cl. ..................................... 29/621.1; 29/595; 73/727; 264/56; 264/60; 338/4
[58] Field of Search ................. 73/726, 727, 720, 721, 73/715, 716, 717, 718, 719, 722, 723, 724, 725, 756, DIG. 4, 728; 338/4, 42; 361/283; 29/595, 621.1; 264/56, 60, 59, 61

[56] References Cited

U.S. PATENT DOCUMENTS 4,984,468 1/1991 Hafner .................. 73/727

Primary Examiner—Donald O. Woodiel

[57] ABSTRACT

A hollow body integrally formed of ceramic material and comprising a cavity formed therein and an integral connecting joint including a passage to said cavity at least one side of said cavity being confined by a diaphragm integral thereto. The ceramic hollow body may be produced by merging two green individual parts together followed by burning, the individual parts having large complementary contact surfaces with each other.

10 Claims, 11 Drawing Sheets

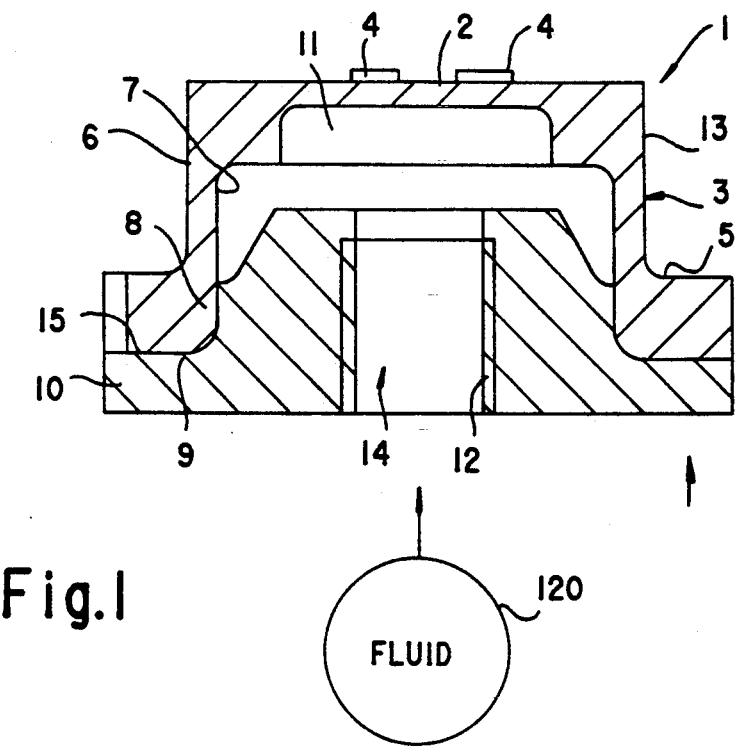
Fig.1
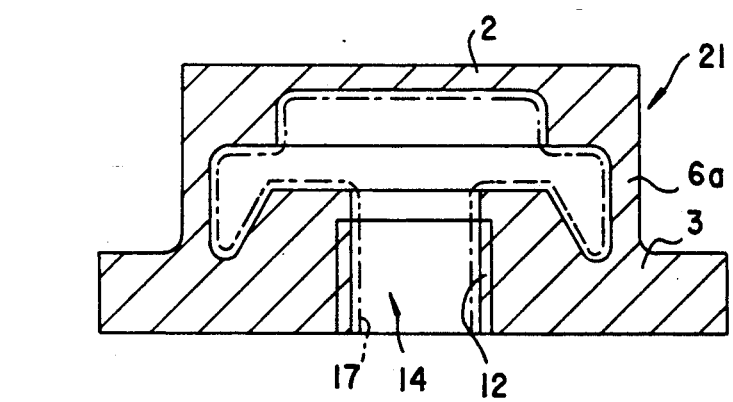
Fig.2
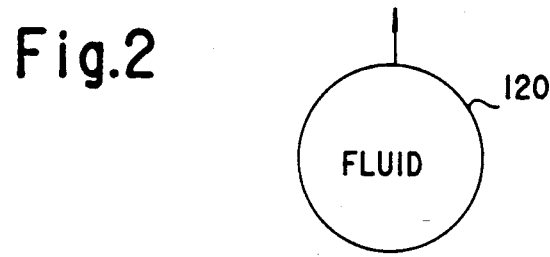

CERAMIC HOLLOW BODIES AND METHOD OF MANUFACTURING SUCH BODIES

This is a continuation-in-part application of parent application U.S. Ser. No. 627,103, filed Dec. 13, 1990, abandoned.

FIELD OF THE INVENTION

The invention relates to ceramic hollow bodies preferably of a type having integrally formed a diaphragm thereon and including a cavity and methods for manufacturing such ceramic hollow bodies.

BACKGROUND OF THE ART

Recently, ceramic materials have found increasing use in various technical fields. In view of the temperature resistancy and form consistency they may be used under conditions where organic synthetics fail. Nevertheless, there is still a problem with using ceramic materials for manufacturing elements specifically of complex form, e. g. hollow bodies. Up to now mass production is possible for ceramic parts of very simple shape which may be formed in green state by usual pressing tools, for example, in dry pressing processes followed by a burning or sintering step. Ceramic hollow bodies have been produced by the so called ooze or slime molding method where a watered ceramic powder is condensed in a closed mold having porous walls by removal of liquid through these walls. However, the density achieved and, therefore, the stability of such bodies are unsatisfactory depart from the method being cumbersome and energy consuming, thus applicable only for a piece-by-piece production.

Alternatively, ceramic bodies of complex shape, specifically provided with cavities may be produced by the so called laminating technique (U.S. Pat. Nos. 4,864,271; 4,972,579; 4,894,635). Here, a plurality of thin green ceramic foils having desired outer contoures or inner openings are formed to a stack followed by burning or sintering of the so formed body. Inner spaces have to be filled with corresponding rigid inserts which are evaporated or sublimated during the burning step. It is clear that such a laminating technique is difficult to process specifically when manufacturing relatively small elements.

The U.S. Pat. No. 4,481,497 discloses a pressure sensor employing a ceramic substrate and a ceramic diaphragm formed as separate parts and connected together. The substrate is provided with a cavity allowing deformation of the diaphragm. The diaphragm is provided with transducer means comprising a resistor bridge. Again, the known pressure sensor is complex in design and costly to be manufactured.

The DE-A-35 10 042 (U.S. Ser. No. 591,728) discloses a pressure sensor comprising a pressure transducer and a pressure measuring capsule. The capsule includes a membrane in surface contact with a diaphragm of the pressure transducer. The membrane of the capsule forms one wall of a cavity further defined by an opposite rigid plate and flexible transition portions connecting this plate with the membrane. Again, the design of the known pressure transducer is complex and the manufacturing thereof costly.

The U.S. patent application Ser. No. 322,142 relates to a pressure transducer comprising a rigid body formed of ceramic material with a ring-like shape having a central opening and a radially extending plane end surface, a diaphragm unitary with the rigid body and covering the opening at an end surface opposite to the plane end surface and thickfilm resistor means applied to at least one of two main surfaces of the diaphragm. Whilst this pressure transducer has a relatively simple design and is easy to be manufactured, it is difficult to position and fix it to a measuring position with the tendency of the diaphragm to be inadvertently tensioned or twisted.

The European patent application 0 232 048 discloses a ceramic arc tube for a high-pressure metal-vapor discharge lamp which is produced by forming a green ceramic tubular body of a first ceramic material; forming at least one green end cap of a second ceramic material the end cap including a cylindrical portion and a flange portion; positioning the cylindrical portion into a corresponding end portion of the green ceramic tubular body and burning the assembly. The ceramic material for the green ceramic tubular body may have a greater burning shrinkage than the ceramic material for said end cap. There is neither a diaphragm provided nor a connecting joint for connection to a fluid path.

The European patent No. 0 142 852 discloses a method of connecting of two halves of a hollow body made of green ceramic. Specifically, a semisphere body portion is inserted into one of two pressing molds each. By moving the pressing molds toward each other contact surfaces of the two halves engage each other. Integration at the contact surfaces is achieved by applying vibrations to one of the pressing molds. Then, the completed sphere is burned. There are no diaphragm and connecting joint formed to the sphere. Furthermore, the method is not adapted for mass production since each sphere must be individually formed under vibration.

There is another problem with the use of ceramic bodies: It is relatively difficult to fix them at a desired device of use. Up to now complex metallic clamping devices or housings are necessary or a metallic connecting element is embedded into the ceramic body by very specific technical processes.

U.S. Pat. No. 4,894,635 discloses a typical example for mounting a strain sensor formed of ceramic material by the above mentioned laminating technique. Specifically, the ceramic body is accommodated within a housing which is covered by a lid member. The three members are maintained in the assembled state by a cauling member engaging the housing body and the lid member pressing the peripheral part of the ceramic body against the housing body. An O-ring is interposed between the lower surface of the ceramic body and the opposite inner surface of the housing body. The housing body has a pressure hole formed therethrough communicating with a through-passage in the ceramic body. The housing body has formed thereon a stub provided with an outer threading for connection to a path means. It will be appreciated that this is a rather complex mounting means for the ceramic body.

Similarly, U.S. Pat. No. 4,898,035 discloses a pressure sensor including a cylindrical metallic housing having an open end portion in which the ceramic sensor is fixedly accommodated. A metallic sealing member in the form of an annular disk having an opening is fluid-tightly secured at its radially inner portion to the radially outer or peripheral portion of the bottom wall of the ceramic body via an annular bonding layer formed of a glass or brazing material. This assembly is accommodated in a fluid-tight manner into a cylindrical metallic housing.

Furthermore, U.S. Pat. No. 4,934,193 discloses a pressure sensing transmitter comprising a housing. The housing is made of stainless steel and a metal isolation diaphragm is joined to the housing. An isolation fluid is sealed in a space between said isolation diaphragm and the sensing surface of the ceramic sensor. The metallic housing is provided with a passage having an inner threading for connection to a fluid path.

SUMMARY OF THE INVENTION

It is an object of the present invention to provide a ceramic hollow body which is simply to be manufactured and has, nevertheless, the desired characteristics, as stability, reproducibility and/or accurate dimensions.

It is a further object of the present invention to provide ceramic hollow bodies which are easy to be secured to any device of use.

It is a still further object of the present invention to provide a method for manufacturing such ceramic hollow bodies. It is a still further object of the present invention to name specific advantageous applications of such ceramic hollow bodies. One method of the invention comprises the steps of providing a mold according to a final shape of said body, the shape including a diaphragm and a connecting joint integrally formed on said body, said connecting joint permitting direct connection and mounting to a fluid path means; putting a sublimable mold insert for forming a cavity in said hollow ceramic body and a through-passage from said cavity through said connecting joint into said mold; filling said mold with ceramic material; pressing said material in said mold up to said final shape of said body to produce a green body; removing said green body from said mold; and burning said green body said mold insert being sublimed during the burning step. An alternative method of the invention comprises the steps of forming a first of two green body portions of ceramic material, said first portion having integrally formed thereon a diaphragm confining a first side of a cavity formed within said first portion having an essentially cylindrical peripheral shape; forming a second of said two green body portions of ceramic material having an essentially cylindrical outer peripheral shape complementary to said cylindrical shape of said cavity and being provided with a through-passage; fitting said two green body portions together at their peripheral surfaces to form a combined green ceramic body; and burning said so-formed green body, said two portions forming said hollow ceramic body having said cavity therein said through passage leading to said cavity for fluid path thereto. A ceramic hollow body of the invention is integrally formed of pressed and burned ceramic material said hollow ceramic body enclosing a cavity and comprises a rigid body portion confining at least one side of said cavity and being provided with a through-passage to said cavity; a diaphragm confining a second side of said cavity; wall portions arranged between said rigid body portion and said diaphragm and confining other sides of said cavity; and a connecting joint integrally formed at said rigid body portion of said body for direct connection and mounting thereof to a fluid path means for passing fluid from said path means through said through-passage to said cavity.

Preferred improvements of the method, the ceramic hollow bodies and their applications according to the invention are defined in dependent claims.

Further advantages and features of the invention will become apparent from the description of embodiments given below with reference to the drawings.

BRIEF DESCRIPTION OF THE DRAWINGS

FIGS. 1 and 2 are elevational cross sectional views of two embodiments of ceramic hollow bodies;

DESCRIPTION OF PREFERRED EMBODIMENTS

Figure 3:
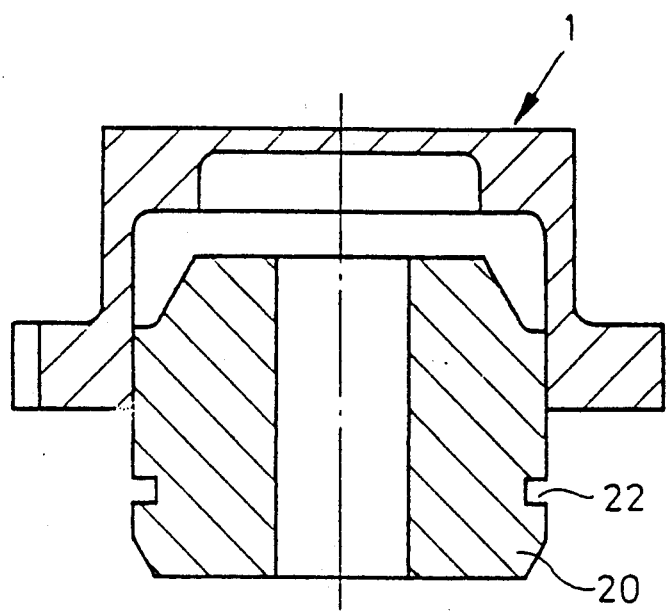
FIGS. 3 to 9 are similar views as in FIGS. 1 and 2 of ceramic hollow bodies provided according to the invention, with connecting portions.

Referring to FIG. 1 showing a first embodiment of the invention there is provided as a main element of a hollow body 1 according to the invention an essentially cylindrical hat type element 3 integrally formed of a relatively rigid torsion ring 13 of preferably rectangular cross section spanned at its top side by diaphragm 2 and connected to a radial mounting flange 5 by a flexible transition portion 6. Mounting flange 5 serves for securing or mounting body 1 to any desired device of use. Diaphragm 2 has applied thereto elements 4, preferably by thick film screen printing technique for detecting appropriate physical characteristics as will be explained in more details hereinafter. An insert element 10 having a cylindrical outer peripheral surface 8 snugly fits into element 3 in contact with inner peripheral surfaces 7 of element 3. In addition to this engagement between the inner surface 7 and the outer surface 8 the bottom side of flange 5 may be provided with a radially extending surface 9 in contact with a complementary surface 15 of insert element 10. Element 3 and insert element 10 are formed of ceramic material, which may have different characteristics, as to enhance merging together, e. g. different burning shrinking rates, put together in green state and then burned in a sintering process to one integral body 1 with contacting surfaces 7/8 and 9/15 respectively, strongly adhering to each other.

Specifically, the two individual elements are combined to a green body and burned resulting in a unitary sensor body sintered together at opposing contact surfaces. In contrast to known devices with laminated individual elements and the mold insert surrounded thereby the contact surfaces do not extend in several planes one above the other but are put together plug-like at the periphery. This permits a higher positioning accuracy of the individual elements and a higher stability of the pressure sensor since these contact surfaces provide a larger contact area between the inner peripheral surface of the base element and the outer peripheral surface of the insert element. Furthermore, the contact surfaces extend in an essentially unloaded zone such that there are no tensions in the diaphragm and, therefore, the contact surfaces will not negatively influence the connection stability of the sensor body.

Particularly advantageous is the cylindrical shape of the insert element inserted into the correspondingly formed pot-like inner cylindrical surface of the base element prior to sintering. Furthermore, the clamping portion of the base element and the insert element may engage each other such that the two elements are clamped during the sintering process at the later clamping portion of the unitary sensor body.

For compensating manufacturing tolerances, the contact surfaces of the base element and the insert element may be formed conically complementary to each other such that even with manufacturing molds having large tolerances or showing wearing a tight contact at the peripheral surfaces will be achieved prior to the sintering process. This results in a further simplification and cost reduction of the manufacturing method.

Insert element 10 and opposing diaphragm 2 form a cavity 11 which may be supplied with a fluid through a passage 14 preferably provided with an inner threading 12 such that the fluid comes into contact with diaphragm 2. As may be seen from the drawing insert element 10 has a simple plug type form without any inverse cuts such that it may be relatively easy formed of ceramic material and then inserted into element 3 formed of essentially similar or a different material. Inserting insert element 10 into element 3 forms cavity 11; thus, no core insert or similar measure is necessary for forming cavity 11 during sintering. Insert element 10 having a simple outer shape may be easily formed quite accurately fitting exactly into element 3 formed accurately as well.

After burning or sintering of the such combined hollow body 1 the latter may be secured by flange 5, as indicated by arrows, to a measuring position or the like. Alternatively, according to the invention connection may be achieved by any other desired connection and/or mounting to a fluid path or supply 120 as by inner threading 12 omitting the need of additional securing elements as flange 5 in view of contacting surfaces 7/8 normal to contacting surfaces 9/15. Even with high pressure at cavity 11 there is no danger of a separating pealing off at either contacting surfaces.

Figure 12:
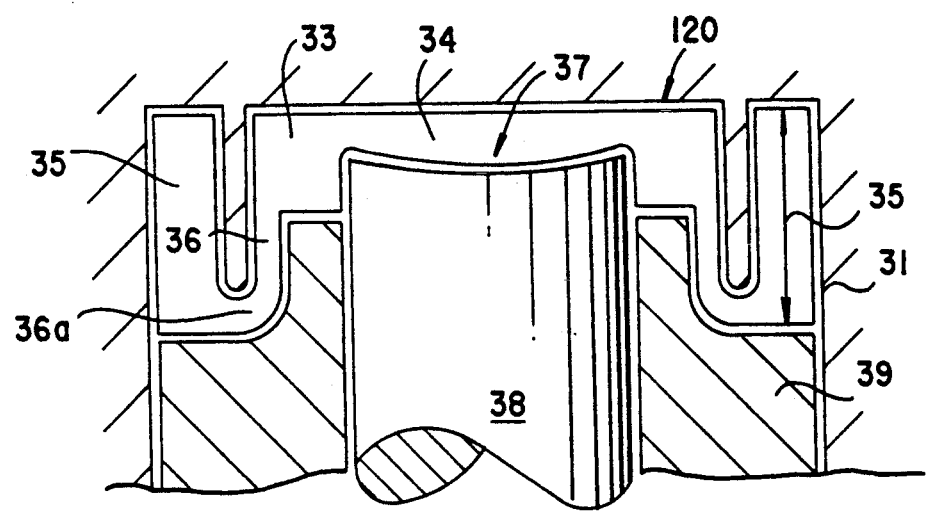
FIG. 12 is a schematic cross section view illustrating the forming of a green hollow ceramic body.

In FIG. 12 the manufacturing of a hollow ceramic body 120 by a simultaneous forming both of a diaphragm 34 and a base 33 with its clamping portion 35 of ceramic material in one step is illustrated. In contrast to the illustration in FIG. 1 the clamping portion 35 projects upward up to the top side of the diaphragm 32 resulting in a further increased defined bending flexibility of the transition tube portion 36. Furthermore, with such a design the top side of the diaphragm 32 and the top side of the clamping ring 35 may be treated in one method step, f. i. lapped and may be jointly coated or in a screen printing method jointly printed after burning of the hollow ceramic body 20.

For manufacturing the hollow ceramic body 120 first a ceramic powder is filled into the mold cavity between a pressing piston 38 and a complementary mold portion 31 and is highly densified by the mutual high pressure. This results in a desired diaphragm enforcement 37 of the diaphragm 32 the displacement of the pressing piston 38 being adjustable for achieving different diaphragm enforcements 37 (for adaptation to the actually desired pressure range).

Of high importance with the joint forming of the hollow ceramic body 120 is a pressing tube 39 surrounding the pressing piston 38 and axially adjustable thereto which pressing tube 39 in particular forms the clamping portion 35, the transition tube portion 36, and the transitions 36a with defined radii and wall thickness. By forge-like pulsing of the pressing piston 38 and the pressing tube 39 in respect of the complementary stationary mold portion 31 a particularly homogenous structure of the unburned or green sensor body 1 is achieved having particularly high stability without providing any contact surfaces between several elements as usual up to now. The unitary sensor body so formed is then burned as well known in the art.

FIG. 2 illustrates a second embodiment of the invention comprising a hollow body 21 of high stability again provided with a cavity 31 and an connecting inner threading 12 formed when pressing the green ceramic element. Threading 12 constitutes the connecting means 5 of this embodiment. For forming cavity 11 a complementary core insert 17 (in dash-dot lines) of evaporable or sublimable material as hexabromobenzene is enclosed by ceramic material pressed in an appropriate mold. Threading 12 offers a direct connection to a duct in a very simple manner. Any strains caused by screwing a connecting element into the threading 12 will be kept away from diaphragm 2 by transition portion 6a. Thus, no separate housing is necessary for encapsulating or mounting hollow body 21. This embodiment needs particularly few production steps and low production costs.

Hollow bodies of FIGS. 1 and 2 include the following essential features:

1. Both the form and the manufacturing process may be applied to ceramic hollow bodies in general. Essential for the invention is the connecting of individual elements at contacting surfaces complementary to each other by telescoping or merging into each other in order to achieve correspondingly large contacting surfaces and, therefore, a high stability with the contours of the individual elements being selected as simple as possible in order to offer mass production with relatively cheap tools.

2. As a connecting or mounting means not only an inner threading may be used but any connecting or mounting means may be directly formed at or in the ceramic hollow body. For example, an outer threading may be applied during extrusion onto the green outer body by a thread cutter. A similar method is applicable for inner threadings with reasonable inner diameters. Another specifically simple embodiment is a rigid base body integrally comprising a diaphragm and being provided with a threading on its outer periphery.

3. The designs of ceramic hollow bodies are not limited to a hat type unitary element provided with a pressure sensor diaphragm and an inserted plug but any other designs or shapes may be applicable as well as long as their individual parts may be easily formed for instance by dry pressing, and have appropriately large complementary contact surfaces and a design with the possibility of being shifted or telescoped into each other.

4. Such a ceramic hollow body may as a basic body not only be used for pressure sensors but for any other type of sensors or even other types of use.

5. As far as the ceramic hollow body comprises a diaphragm the latter is not limited for having pressure transducer elements applied thereto. The diaphragm may serve various other purposes and may be appropriately designed for example as a porous diaphragm.

As regards applicable materials, preferably $AL_2O_3$, and the methods to be applied for forming the simple individual elements as well as the details of burning or sintering it is referred to the US Patents mentioned above. Therefore, hereinafter only a few examples of hollow ceramic bodies are explained considered particularly preferrable.

Since the embodiments according to FIGS. 3 to 11 will be easily understood by a skilled person when contemplating the drawings only a very short explanation of the drawings is given below.

Thus, for example, FIG. 3 shows as an extremely simple connection of a hollow body to any other type of device. Plug 20 is provided with an annular groove 22 into which, for example, clamps of a clamp coupling may be engaged.

Figure 4:
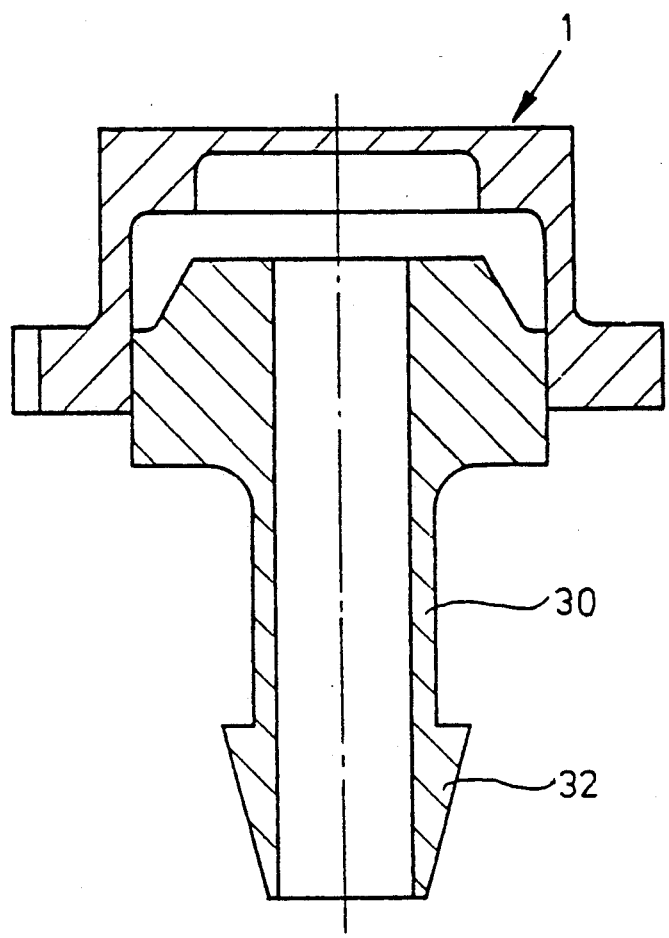

FIG. 4 illustrates the shape of plug 30 having an annular projection or ring 32 for applying a hose thereto.

Figure 5:
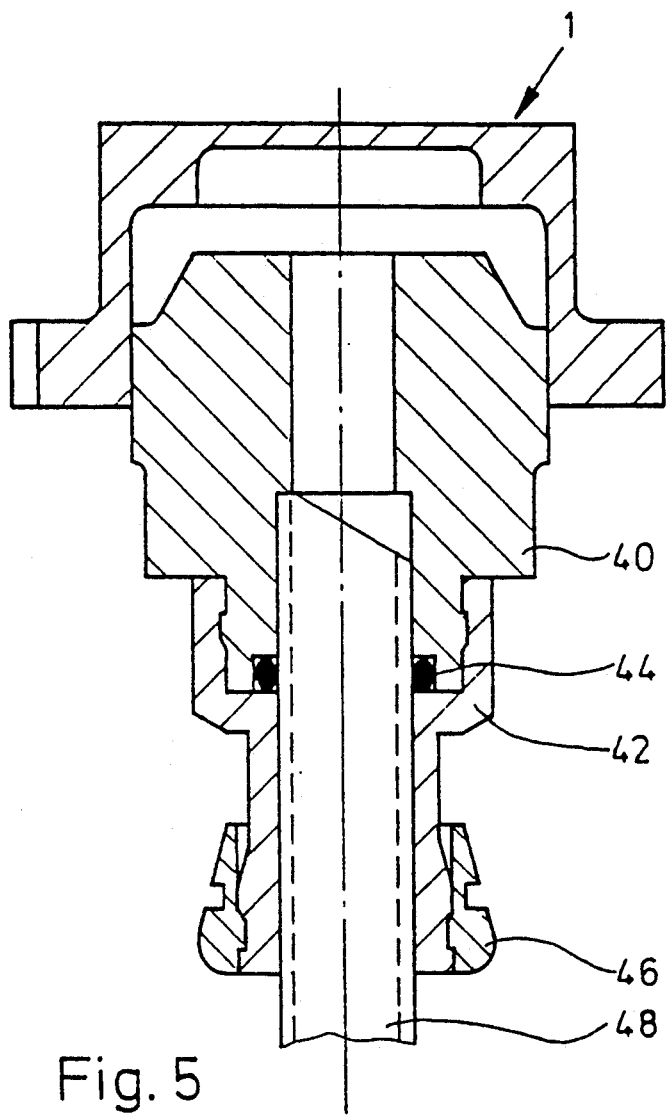

FIG. 5 illustrates a plug 40 provided with a passage into which a tube 48 sealed by a ring sealing 44 may be inserted. Tube may be secured by means of a clamping connection 42 including clamp element 46.

Figure 6:
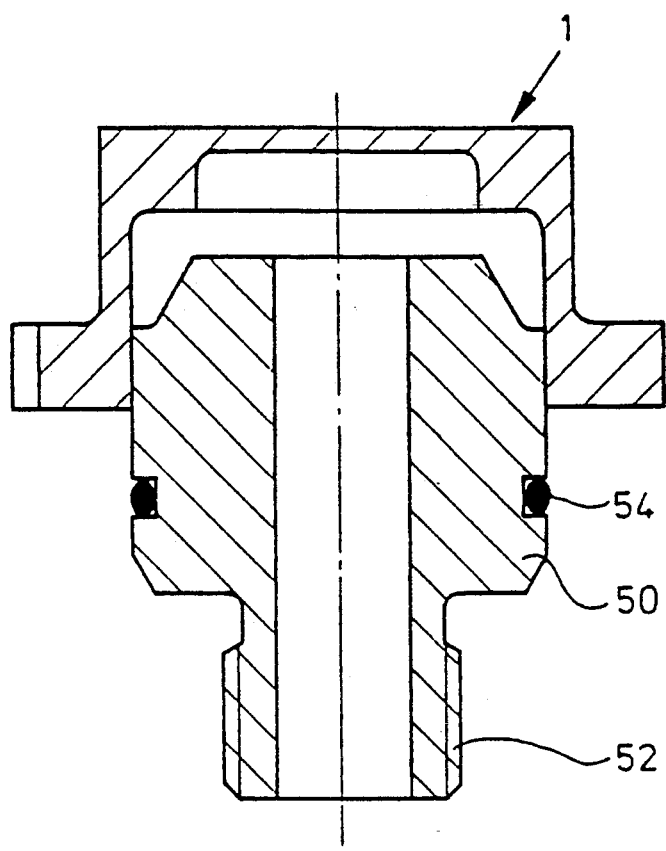

FIG. 6 illustrates a plug 50 being provided with an outer threading 52 onto which a nut (not shown) may be screwed with a sealing 54 therebetween.

Figure 7:
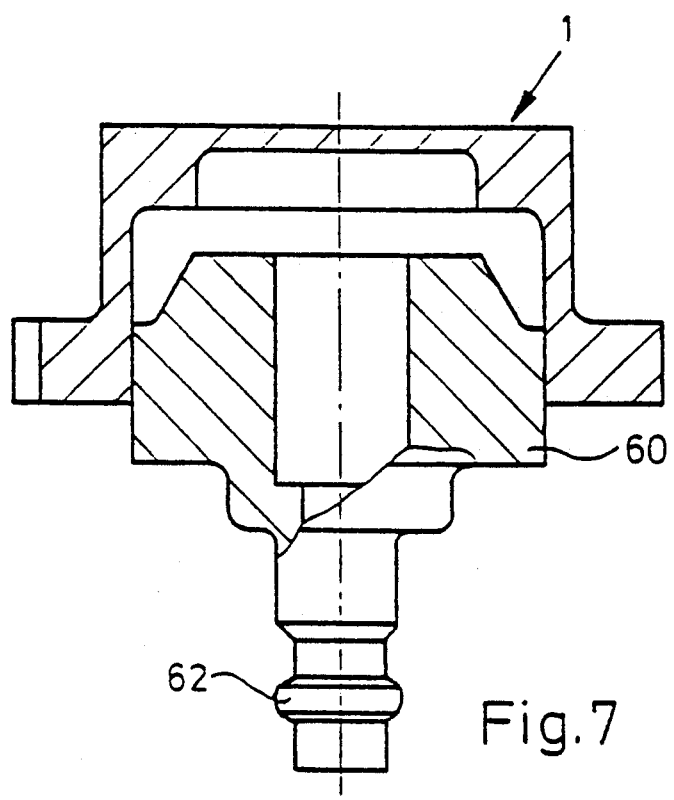

With the hollow body according to FIG. 7 a plug 60 is used having an extension provided with a surrounding rim or bulge such that again a hose may be applied thereto or a coupling having clamps engaging behind the rim.

Figure 8:
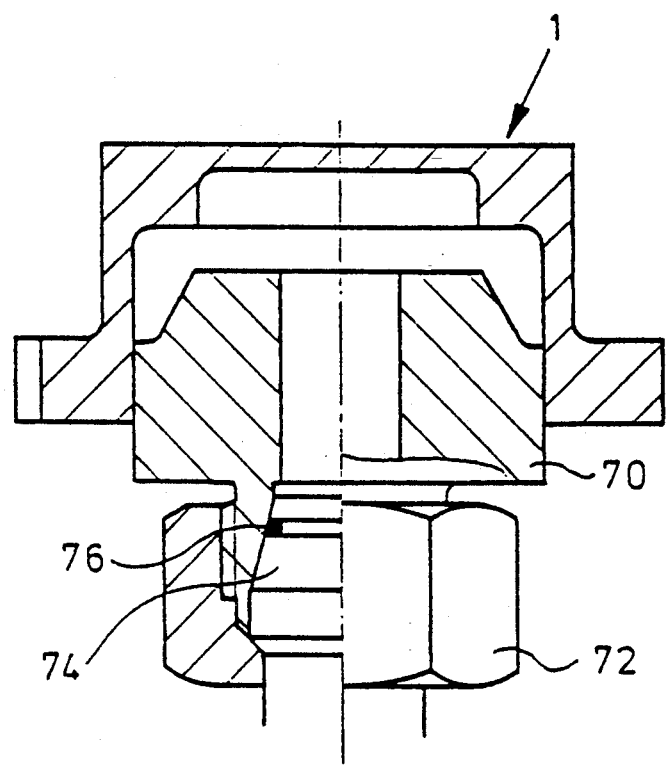
Figure 9:
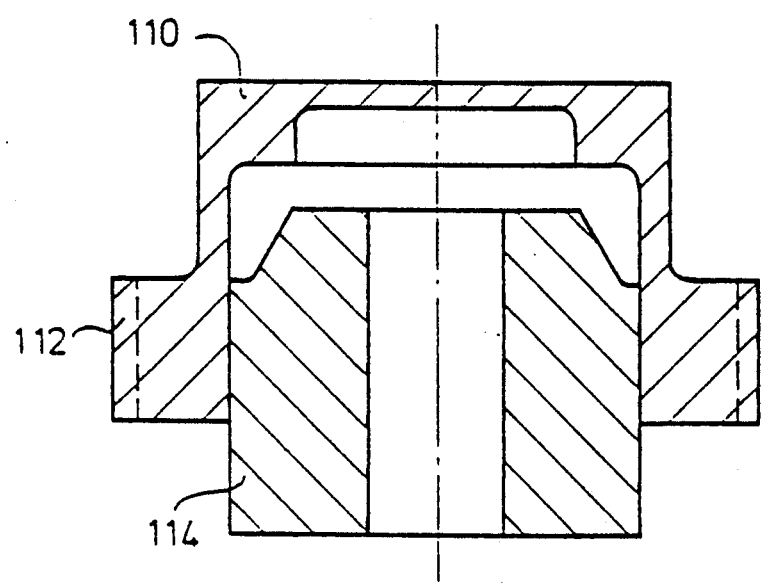

FIG. 8 illustrates a hollow body having a plug 70 provided with an outer threading for having screwed thereto a nut 72 and a passage conically expanded for having inserted thereto a complementarily formed cone provided with an annular sealing 76. With the embodiment of FIG. 9 a hollow body 110 comprising an inserted plug 114 may be screwed by means of an outer threading 112 to a tube (not shown).

Figure 10:
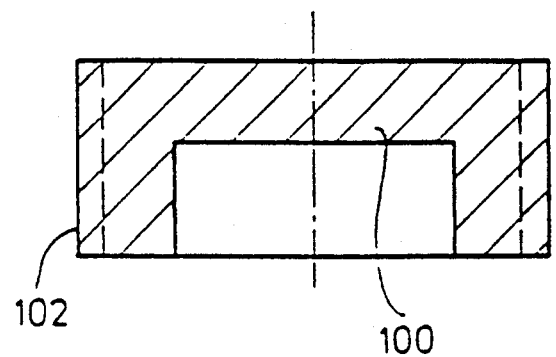
FIG. 10 is a schematic cross sectional view of a ceramic hollow body provided with an extremely simple mounting or connecting means.

The schematic representation of FIG. 10 shows the principal possibilities for securing a pot type hollow body 100 by means of an outer threading 102.

Though for sake of simplicity only modifications of the basic form of a hollow body according to FIG. 1 are illustrated in FIG. 3 to 9 the invention is not limited to such type of modifications. The individual elements eventually forming the ceramic hollow body may have any desired form as long as they have formed thereon complementary contact surfaces engaging each other by telescoping into each other. Alternatively, unitary body 21 of FIG. 2 may be provided with one (or more) of the connecting means illustrated in FIGS. 3 to 9. Most preferably, the connecting means will have a passage leading to cavity 11.

Figure 11:
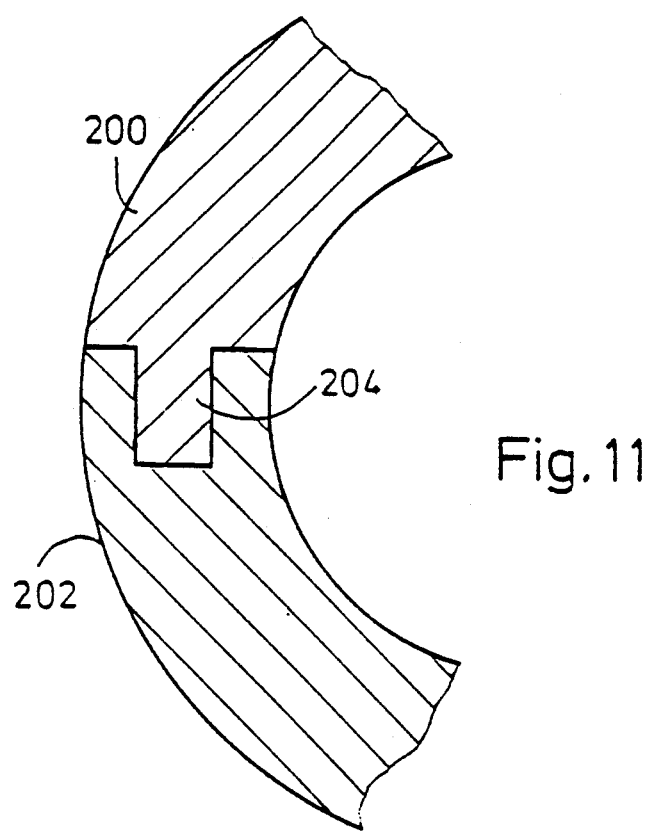
FIG. 11 is a similar view of a further ceramic hollow body formed of portions provided with contacting surfaces complementary to each other.

For example only it is referred to FIG. 11 showing a possible connection between two curved individual parts e. g. two halves of a sphere. The upper hemisphere 200 is provided with a cylindrical annular extension 204 fitting into a corresponding groove formed in the lower hemisphere 202. As long as the inner shape or surface is of no importance a simple step connection may be used at the inner side.

In the embodiments explained above the contacting surfaces are explained as being essentially complementary cylindrical surfaces. However, a preferably slight conical shape, eventually with a curved wall is applicable as well. With a conical shape the complementary contacting surfaces are slightly pressed against each other upon insertion. Alternatively, stepped complementary surfaces may be used as well.

It should be noted that due to having a connecting or mounting means directly formed onto the ceramic hollow body there is no more need to include a separate connecting element made of metal. No mounting means may even be necessary when just connecting the body to a device of use or a hose or other duct.

As mentioned before, the diaphragms integrally formed with the ceramic hollow bodies of the preferred embodiments may have any appropriate design in accordance with the desired use. A preferable use instead of a pressure sensor may be as a porous diaphragm for gas separation since these diaphragms sustain temperatures of several 100° C. Therefore, light molecules of process gases may be separated pressure-free or at low pressures and high temperatures. An average pore radius may be in the order of 15 to 30 Angström, see Zeitschrift Chem.-Ing.-Tech. 56 (1984) Nr. 9 S. 1720. A further application may be as an oxygen ions conducting ceramic diaphragm for pH-sensors (SCIENCE, vol. 207, Mar. 14, 1980, page 1200–1202). Further preferred applications of sensors formed as ceramic hollow bodies according to the invention or using them are temperature sensors, gas or humidity sensors for detecting the adsorption and desorption of gases in response to changes of electric conductivity and infrared sensors using the pyroelectric effect (Keramik Bulletin, vol. 64 No. 12 (1985), pages 1581 to 1585). Still another application is as a heat conductivity sensor (Technisches Messen, Jahrgang 51, 1984, Heft 11, pages 385 to 393).

From the before mentioned applications it may be seen that ceramic hollow bodies of the invention may be of particular use in high temperature processes. In this connection porous diaphragms are more and more important for gas or liquid separation where these fluids may diffuse through the porous diaphragm as a semipermeable wall, for example, by osmotic pressure. By appropriately selecting the thickness and the pore size the diaphragm may be conveniently adapted to the desired conditions in wide ranges. An important field of application relates to environmental and pollution problems specifically in connection with motor cars.

Further specific applications of diaphragms of the invention are vapor perméable diaphragms for alcohol separation, gas separating diaphragms for the hydrogen separation and ultrafiltration diaphragms for a high temperature sterilization. Such diaphragms may be used as well for biotechnologic processes as alcohol fermentation processes where ultrafiltration diaphragms may be used for recovering enzymes.

To summarize, it will be appreciated that on the basis of the considerations in connection with the present invention it is possible to produce ceramic hollow bodies having satisfactory stability in a simple manner. The ceramic hollow bodies offer a large variety of applications with a specific field of the use of such ceramic hollow bodies having a diaphragm or diaphragms integrally formed thereon in the fields of the sensor technique and gas/liquid processing technique. With the bodies being integrally provided with connecting means mounting or securing to a device of use is quite simple omitting specific measures as providing metallic housings.

The specific examples and embodiments discussed above are considered illustrative only, and not limited thereto. The scope of the invention is defined in the appended claims.

I claim:

1. A method of manufacturing a hollow ceramic body comprising the steps of:
   forming a first of two green body portions of ceramic material, said first portion having integrally formed thereon a diaphragm confining a first side of a cavity formed within said first portion having an essentially cylindrical peripheral shape;

forming a second of said two green body portions of ceramic material having an essentially cylindrical outer peripheral shape complementary to said cylindrical shape of said cavity and being provided with a through-passage;

fitting said two green body portions together at their peripheral surfaces to form a combined green ceramic body; and burning said so-formed green body, said two portions forming said hollow ceramic body having said cavity therein said through passage leading to said cavity for fluid path thereto.

2. The method of claim 1, wherein said forming step of said first portion comprises urging two movable mold portions against said ceramic material filled in a stationary mold portion, one of said movable mold portions for forming said diaphragm being adjustable relative to said other mold portion for varying the thickness of said diaphragm.

3. The method of claim 1, wherein said essential cylindrical surfaces of said two green portions are slightly tapered.

4. The method of claim 1, wherein a connecting joint is formed to said second portion of said body including said through-passage and being adapted for direct connection and mounting to a fluid path means.

5. The method of claim 4, wherein said connecting joint is a threading.

6. The method of claim 1, wherein a connecting joint is formed to one of said green portions of said body including said through-passage and being adapted for direct connection and mounting to a fluid path means.

7. The method of claim 6, wherein said connecting joint comprises a threading.

8. A method of manufacturing a ceramic sensor body comprising the steps:

forming a first of two green body portions of ceramic material, said first portion having integrally formed thereon a diaphragm confining a first side of a cavity formed within said first portion having an essentially cylindrical peripheral shape;

forming a second of said two green body portions of ceramic material having an essentially cylindrical outer peripheral shape complementary to said cylindrical shape of said cavity and being provided with a through-passage;

fitting said two green body portions together at their peripheral surfaces to form a combined green ceramic body; and burning said so-formed green body, said two portions forming said ceramic sensor body having said cavity therein said through passage leading to said cavity for fluid path thereto; and applying sensor means to said diaphragm.

9. The method of claim 8, wherein said forming step of said first portion comprises urging two movable mold portions against said ceramic material filled in a stationary mold portion, one of said movable mold portions for forming said diaphragm being adjustable relative to said other mold portion for varying the thickness of said diaphragm.

10. The method of claim 8, wherein said essential cylindrical surfaces of said two green portions are slightly tapered.

* * * * *